H. F. PRICE.

FISHING TACKLE CASE.

No. 10,598. Reissued May 19, 1885.

Witnesses:

E. Clay Smith

Alex. Scott

Inventor.

Henry F. Price

By Thomas A. Stetson

Atty

UNITED STATES PATENT OFFICE.

HENRY F. PRICE, OF BROOKLYN, NEW YORK.

FISHING-TACKLE CASE.

SPECIFICATION forming part of Reissued Letters Patent No. 10,598, dated May 19, 1885.

Original No. 275,703, dated April 10, 1883. Application for reissue filed February 10, 1885.

*To all whom it may concern:*

Be it known that I, HENRY FENTHEM PRICE, a citizen of the United States, residing at Brooklyn, in the county of Kings, State of New York, have invented a new and useful Improvement in Fishing-Tackle Cases, of which I hereby declare the following to be a full, clear, and true description, reference being had to the accompanying drawings, forming part thereof.

Figure 1:
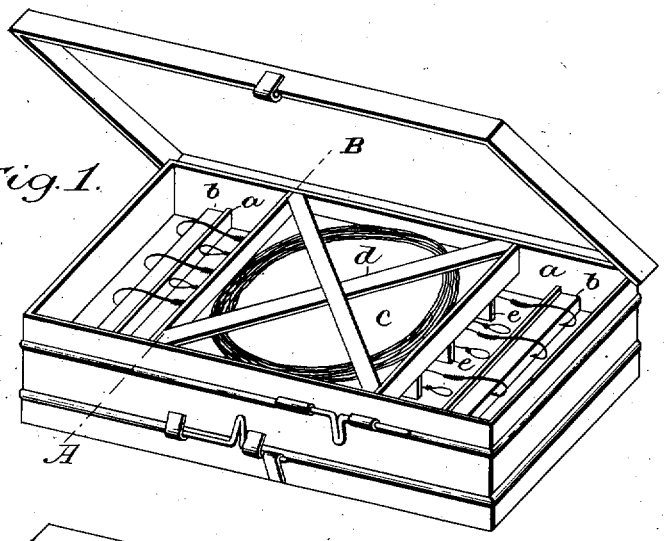
Figure 2:
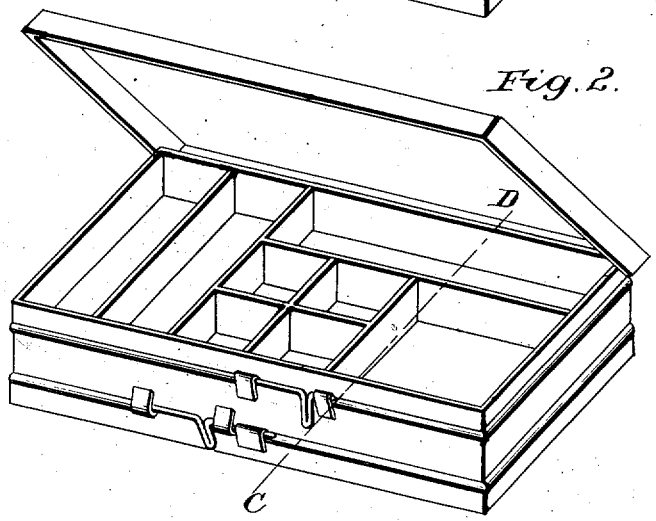
Figure 3:
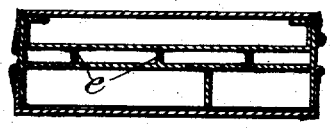

Figure 1 is a view in perspective showing one-half of the internal shape and configuration of the case. Fig. 2 shows the other half of the internal shape and configuration of the case. Fig. 3 is a sectional view through Figs. 1 and 2 at A B C D.

Similar letters of reference indicate corresponding parts in all the figures where they occur.

On one side, a short distance from each end of the case, is a shallow partition or division, *a*, crossing the same. This retains in place and secures a narrow strip of cork, *b*, between itself and the extreme inside end of the case. Occupying the central part of the inside of the case is a shallow well or depression, *c*, its top flush with the inside of the case, and crossed by two strips of metal or other material, *d*. The opposite face or side of the case may have the partitions variously arranged. In Fig. 2 the divisions or separations are made as believed most convenient.

In use the snelled flies and hooks are inserted into the cork, and the snells are extended under the well or depression through the longitudinal compartments between the uprights *e*. (Shown in sectional view Fig. 3.) In the well coiled lines, leaders, &c., may be compressed and passed into the same through the spaces between the crossed strips, when their natural elasticity, after removing pressure, will cause them to resume their circular form and be effectually retained in said well by the strips *d*, serving as guards or keepers, as shown. One partition or base about midway between the two faces serves as the bottom for both sides or faces.

The two shallow box-lids may be hinged at opposite edges, or both on one edge and provided with independent fastenings, as shown in Fig. 1.

Having thus described my invention, I claim and desire to secure by Letters Patent of the United States—

1. The combination, in a portable case, as described, of a central partition, the uprights *e*, and the shallow well provided with an open face, as and for the purpose set forth.

2. The combination, in a portable case, of a partition, *a*, and cork *b*, the former being made to retain and secure the latter and allow it to serve in holding hooks and their attachments, as herein specified.

3. In a portable case, the series of longitudinal uprights *e*, arranged under the well *c*, in combination therewith, and with one or more soft strips, *b*, all adapted to serve as herein specified.

4. A fishing-tackle case consisting of two compartments having a single partition adapted to serve as the bottom of both, and provided with the partitions *a*, cork strips *b*, and well *c*, substantially as shown and described.

HENRY F. PRICE.

Witnesses:
WILLIAM E. QUINN,
A. W. HIGGINS.